United States Patent Office 3,430,062
Patented Feb. 25, 1969

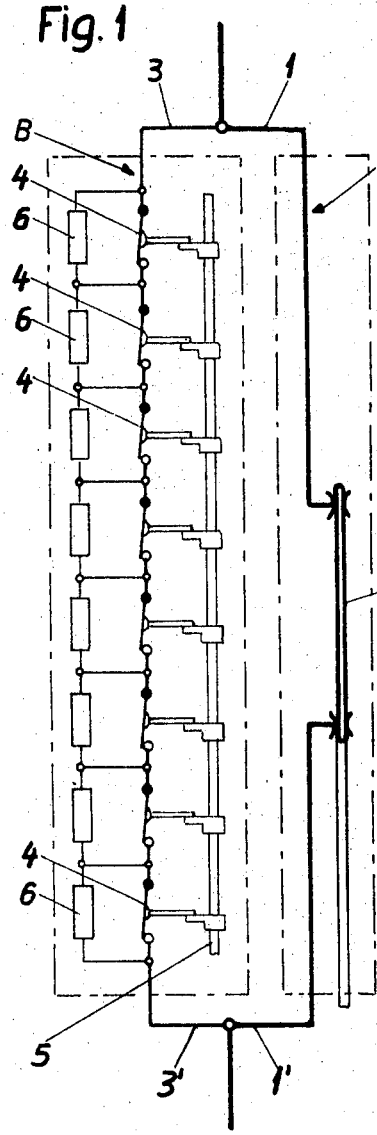
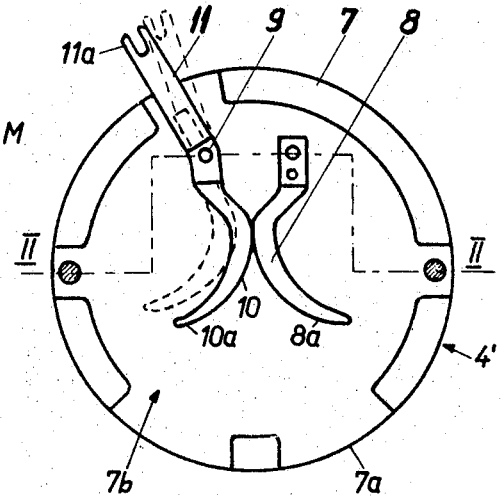
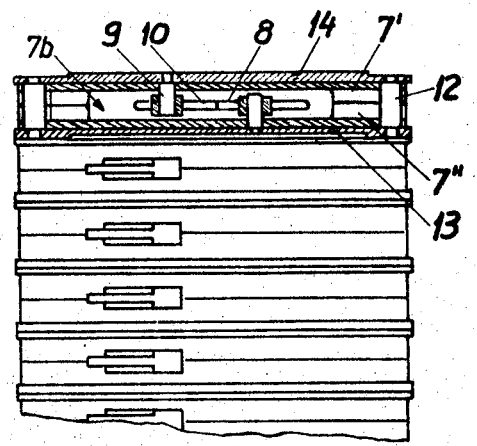

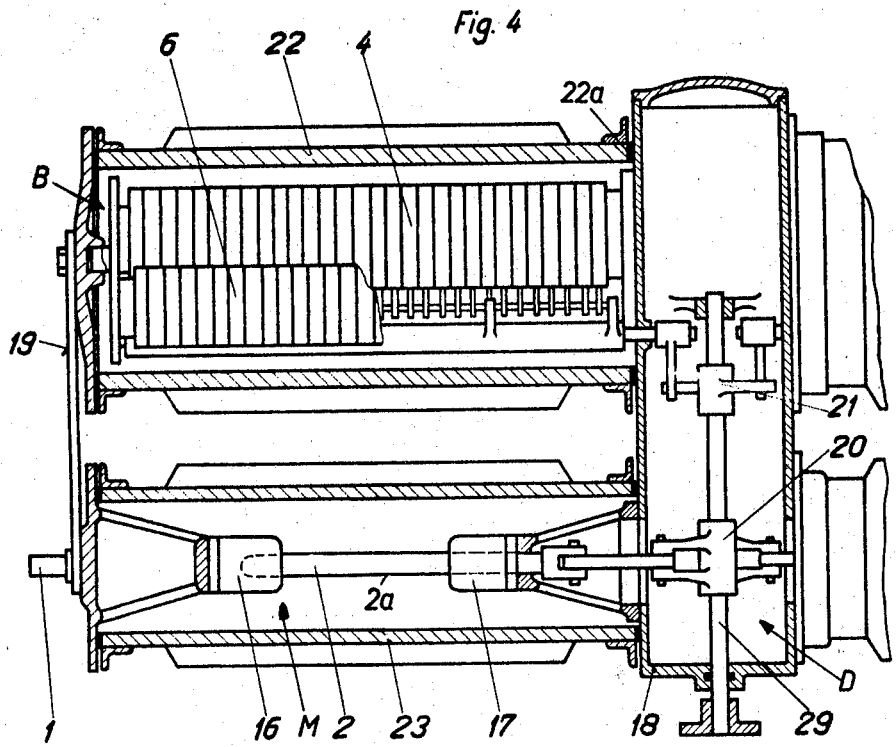
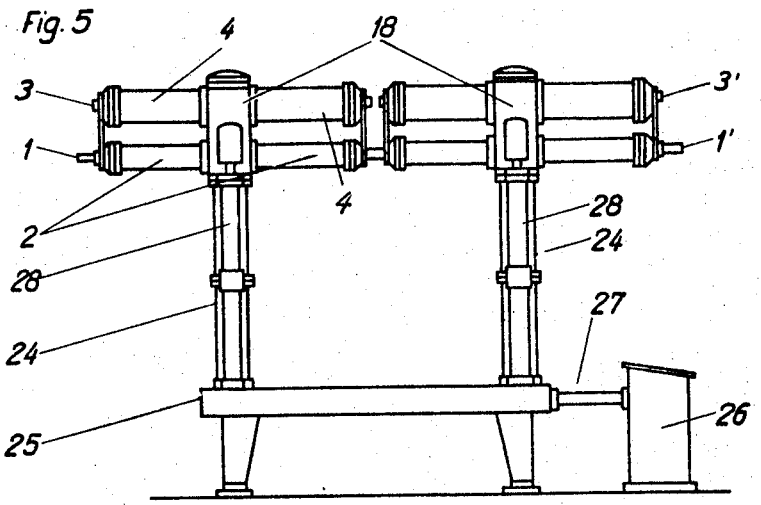

3,430,062
SWITCHING CIRCUIT FOR HIGH-VOLTAGE
DIRECT-CURRENT
Adrian Werner Roth, Aarau, Aargau, Switzerland, assignor to Fabrik Elektrischer Apparate Sprecher & Schuh A.G., Aarau, Aargau, Switzerland
Filed Mar. 19, 1965, Ser. No. 441,220
Claims priority, application Switzerland, Mar. 26, 1964, 3,908/64
U.S. Cl. 307—136
Int. Cl. H01h 9/40
5 Claims

ABSTRACT OF THE DISCLOSURE

A switching apparatus for the interruption of high voltage direct current loads having a main current circuit including at least one disconnector to continuously conduct the operating current. A branch current circuit is connected in parallel with the main support including a plurality of series connected partial interrupter switches. Each of said switches is associated with an impedance connected in parallel thereto for controlling the voltage. Actuating means are associated with the contact member of each partial interrupter switch to open each partial interrupter switch with a time lag relative to the opening of the disconnector to cause extinction of the arc forming when opening the disconnector. The invention involves forming the contact members of each partial interrupter switch from two flat, elongate oppositely curved elements of electrically conductive material. Such elements in the position of closure of the partial interrupter switch being in peripheral contact with each other and determining two curved current paths originating at the point of contact of such elements and diverging away from each other. The plurality of partial interrupter switches from a pile extending in parallel relationship with the disconnector and are operatively connected to a common actuating mechanism.

The present invention has reference to an improved switching circuit for high-voltage direct-current and, more specifically, pertains to an improved switching device or arrangement suitable for switching currents in a workable manner in power networks operating with high-voltage direct-current.

Power transmission by means of direct-current of very high-voltage has recently gained in importance with the advance of rectifier and inverter constructions. However, the development of this mode of power transmission has still been hindered due to the fact that operation of a direct-current network which is composed of more than two stations has been rendered difficult because of the defects of suitable switching devices. Operation has already been made considerably easier if at least load currents and large excess currents can be switched in a workable manner and without a disturbing effect upon the current rectifiers.

Accordingly, it is a primary object of the present invention to provide an improved switching circuit for high-voltage direct-current which enables switching of currents to be carried out in a highly reliable and effective manner while safeguarding against damaging of components of the circuit.

Another considerable object of this invention relates to an improved switching device suitable for switching currents in a workable manner in power networks operating with high-voltage direct-currents, and wherein there is rendered possible a relatively simple and space saving construction.

A further noteworthy object of this invention has reference to an improved circuit arrangement for high-voltage direct-currents incorporating a main current circuit and an auxiliary or branch current circuit arranged in parallel to said main current circuit, said auxiliary current circuit being provided with a plurality of partial interrupter switches which serve for arc extinguishing when a disconnecting switch is opened in the main current circuit, each partial interrupter switch is operably associated with a control impedance, and each aforesaid partial interrupter switch and associated control impedance possesses a flat construction so that they can be assembled into stack formation arranged spatially parallel to said disconnecting switch.

The inventive switching circuit arrangement for high-voltage direct-current comprises a main current circuit in which there is located at least one disconnecting switch for the operating current flowing through said main current circuit, as well as a branch or auxiliary current circuit arranged in parallel to said main current circuit. In this branch current circuit there is located a plurality of series connected partial interrupter switches which open with a certain time-delay after the disconnecting switch and serve for the actual arc extinction. Additionally, an impedance is associated with each partial interrupter switch which serves for voltage control. According to an important aspect of the invention there is preferably associated with the disconnecting switch of the main current circuit at least twenty partial interrupter switches and the aforesaid partial interrupter switches as well as their associated control impedances are constructed as elements of flat configuration which can be assembled into stack arrangement disposed in spatially parallel orientation with respect to said main disconnecting switch.

Other features, objects and advantages of the present invention will become apparent by reference to the following detailed description and drawings in which:

FIGURE 1 is a circuit diagram of the inventive switching circuit;

FIGURE 2 shows details of a preferred form of partial interrupter switch capable of use in the circuit arrangement of FIGURE 1;

FIGURE 3 schematically illustrates in fragmentary view a number of partial interrupter switches, such as shown in FIGURE 2, assembled together into a stack arrangement, wherein the uppermost one of such partial interrupter switches of this stack is shown in cross-sectional view as taken along the line II—II of FIGURE 1;

FIGURE 4 is a cross-sectional view of the inventive switching device showing details thereof, particularly illustrating physical structure of the main disconnecting switch and its actuating mechanism as well as the therewith associated stacks of partial interrupter switches and control impedances; and FIGURE 5 schematically illustrates the assembly of an entire switching device or arrangement composed of four disconnecting switches with associated partial interrupter switches, insulating means, frame and drive.

Describing now the switching circuit appearing in FIGURE 1 it will be understood that the main current circuit M incorporates the conductors 1, 1'. In this main current circuit M there is disposed at least one disconnecting switch 2 designed to continuously conduct an operating current flowing through this main current circuit. An auxiliary or branch current circuit B is arranged in parallel to the main current circuit M and incorporates the conductors or leads 3, 3'. It will also be observed that a plurality of series connected partial interrupter switches 4, capable of being actuated by an actuating rod 5 or other suitable actuating mechanism, are electrically coupled in the aforesaid branch or auxiliary circuit B. Each of these partial interrupter switches 4 are actuated such that they open with a certain time-delay after opening of the main disconnecting switch 2. This manner of operation is well known to the art and for such reason has not been explained or illustrated in considerably greater detail hereinafter.

Since the partial interrupter switches 4 need only conduct the operating current during a very short period of time, typically from the time of opening of the main disconnecting switch 2 until extinguishing of the arc, the conductors 3, 3' and switch elements, e.g., switching contacts of the auxiliary or branch current circuit B must only be designed to handle a fraction of the operating current. In order that the voltage distribution is carried out uniformly across the individual partial interrupter switches 4 each of the latter has associated therewith in known manner a respective control impedance 6. However, due to the fact that the partial interrupter switches 4 are only subjected to loads for short periods of time they can possess a very compact construction. It is particularly advantageous if they exhibit as flat a form as possible, as such is employed for instance for arc extinction gaps and excess voltage breakdown devices. Due to this relatively flat form of the partial interrupter switches 4, and advantageously also the control impedances 6, as will be more fully discussed shortly, a number of such partial interrupter switches can be assembled in a very simple manner into a stack.

Directing now attention to FIGURE 2 there is illustrated in plan view details of a preferred embodiment of partial interrupter switch 4', the bipartite housing 7 of which is shown open to expose internal structure, and such switch is adapted to be employed in the switching arrangement of FIGURE 1. This housing 7 of each partial interrupter switch 4' comprises two housing portions 7' and 7'' (FIGURE 3) formed of a suitable insulating material. It will further be seen that housing 7 is provided with one or more openings or recesses 7a for passage of a suitable gaseous medium into a so-called arc extinguishing compartment 7b formed between these housing portions 7', 7''. In this extinguishing compartment 7b there is located a stationary contact 8 and a pivotally movable contact 10 which can rock about a pivot shaft 9.

It will be appreciated that in FIGURE 2 the contacts 8 and 10 are shown in closed position. Further, an extension 11 formed of insulating material is operably connected with the pivotable switch contact 10 and is provided with a bifurcated or forked end 11a engageable with a non-illustrated actuating rod, such as rod 5 of FIGURE 1 for instance. When this bifurcated end 11a of the extension member 11 is engaged by the actuating rod then the switch contact 10 can be shifted into the phantom line position of FIGURE 2 in order to open such partial interrupter switch 4'. The arc which appears between the open contacts 8 and 10 is driven by the so-called electromagnetic blast or blower effect towards the horn-shaped, diverging free ends 8a and 10a of the contacts 8 and 10 respectively, and extinguishes as soon as the arc voltage exceeds a given value.

It will further be appreciated that it is advantageous to design each partial interrupter switch 4' such that, each one of these switches can faultlessly turn-off the operating current at approximately 2 to 2.5 kilovolts for instance. By way of example, if the main disconnecting switch 2 connected in the main current circuit is M designed for 60 kilovolts then approximately 24 to 30 partial interrupter switches 4 or 4' must be associated with such disconnecting switch 2. As a result, the convenient assembly of a plurality of partial interrupter switches assumes considerable importance, which has led to the inventive stack-like arrangement such as depicted in FIGURE 3. By further referring to this figure, particularly the uppermost partial interrupter switch illustrated in cross section, it will be seen that one contact 8 is mounted to the housing portion 7'' and the other contact 10 to the housing portion 7'. Electric insulating spacer bolts 12 separate the housing portions 7' and 7'' from one another to thereby form and regulate the size of the extinguishing chamber or compartment 7b. In order to increase the blast field there are provided magnetic sheets or plates 13 and 14 which are each electrically coupled with a respective contact 8 and 10, so that by simply stacking the partial interrupter switches and pressing them together by means of tension bolts for instance, there is also effect the electric series connection.

In FIGURE 4 there is only illustrated one-half of a switch assembly comprising a main disconnecting switch with associated partial interrupter switches, control impedances and drive means. It will be appreciated that like reference numerals have been again conveniently employed for the same or corresponding components heretofore described. With this in mind, then, the main current circuit M is seen to begin at the conductor or connecting piece 1 and leads from the stationary contact 16 via the movable switching pin 2a of the main disconnecting switch 2 to the sliding contact 17 arranged at the housing 18 of the drive means D. Once again, an auxiliary or branch circuit B is connected in parallel to the main current circuit M. In this case a connecting lead or conductor 19 extends from the conductor 1 to the stack of partial interrupter switches 4 arranged in series and also to the stack of control impedances 6 associated with such partial interrupter switches, such auxiliary current circuit likewise ending at the housing 18. Furthermore, it should be understood that by rotating the shaft 29 of the drive mechanism D the disconnecting switch 2 and the partial interrupter switches 4 are actuated through the agency of the lever system 20, 21 such that the aforesaid partial interrupter switches also open directly after opening of the main disconnecting switch 2. Quite obviously, during closing the just-considered movements are carried out in reverse sequence.

The stacks of partial interrupter switches 4 and control impedances 6 which are compactly arranged next to one another are housed in a common insulating cylinder or housing member 22 closed at both ends in airtight manner by suitable seal means 22a. This housing 22 is prefrably filled with a gas which is a good electric insulator. It is advantageous to also employ for the control impedance 6 nonmetallic resistors, for instance with voltage-dependent characteristics, which can be easily fabricated in the form of disks or plates, and the thickness of which approximately corresponds to that of the partial interrupter switches. As a result, there is provided a favorable possibility for assembly in that all of the stacks of the described components possess substantially the same length and are arranged spatially parallel to the main disconnecting switch.

It will be seen that the main disconnecting switch 2 which comprises the switching pin 2a and the contacts 16, 17 is also housed in a cylindrical-shaped container or housing 23 which is filled with an insulating oil or a suitable gas, $SF_6$ for instance. The number of main disconnecting switches and partial interrupting switches is dependent upon the operating voltage which is to be controlled and the employed insualting medium.

Thus, in FIGURE 5 there is illustrated a construction of switch arrangement employing four disconnecting switches 2 in the main current circuit. Each two of these disconnecting switches 2 with their associated partial interrupter switches 4 and control impedances 6 are secured to a respective insulator support or rod means 24 mounted upon a common frame unit 25. Reference characters 1, 1' once again denote the conductors or leads for the main current circuit and refernce characters 3, 3' the conductors or leads for the branch current circuit. The drive mechanism 26 actuates in known manner, for instance consistent with what has been previously explained, the main disconnecting switches 2 and the partial interrupter switches 4 via the rod 27, the rotatable insulating means 28 and the nonvisible lever system 20, 21 located in the housing 18.

While there are shown and described present preferred embodiments of the invention it is to be distinctly understood that the invention is not limited thereto but may be otherwise variously embodied and practised within the scope of the following claims.

What is claimed is:

1. In a switching apparatus for interruption of high-voltage direct current loads, having a main current circuit including at lease one disconnector to continuously conduct the operating current, a branch current circuit connected in parallel with said main circuit including a plurality of series connected partial interrupter switches each associated with an impedance connected in parallel thereto for controlling the voltage, and actuating means associated with a contact member of each partial interrupter switch, said actuating means being operative to open each partial interrupter switch with a time lag relative to the opening of said disconnector to thereby cause extinction of the arc forming when opening said disconnector, the improvement wherein said contact members of each partial interrupter switch are formed by two flat, elongate oppositely curved elements of electrically conductive material, said elements, in the position of closure of the partial interrupter switch, being in peripheral contact with each other and determining two curved current paths originating at the point of contact of said elements and diverging away from each other, each of said plurality of partial interrupter switches being assembled in a plane to form a stack of parallel planes extending in parallel relationship with said disconnector, and being operatively connected to a common actuating mechanism.

2. In a switching apparatus as set forth in claim 1 wherein each of said contact members has a horn-shaped free end which diverges from one another.

3. In a switching apparatus as set forth in claim 1 wherein a gas filled insulating housing is provided in which said partial interrupter switches and control impedances are arranged in stack formation.

4. In a switching apparatus as set forth in claim 1 wherein a container filled with insulating oil for housing said disconnecting switch of said main current circuit is provided.

5. In a switching apparatus as set forth in claim 1 wherein a container filled with insulating gas for housing said disconnecting switch of said main current circuit is provided.

References Cited

UNITED STATES PATENTS

| | | |
|---|---|---|
| 1,787,931 | 1/1931 | Besold. |
| 1,947,230 | 2/1934 | Ruppel _____ 200—145 X |
| 2,675,505 | 4/1954 | Flurscheim et al. __ 200—145 X |
| 3,114,816 | 12/1963 | Beatty. |
| 1,603,279 | 10/1926 | Gray _____ 317—11 |
| 2,675,505 | 4/1954 | Flurscheim et al. |
| 2,892,913 | 6/1959 | Thummen. |
| 3,192,440 | 6/1965 | Battensperger. |
| 3,293,496 | 12/1966 | Induni _____ 307—136 |

ROBERT S. MACON, *Primary Examiner.*

T. B. JOIKE, *Assistant Examiner.*

U.S. Cl. X.R.

200—144, 145, 148, 150; 317—11